April 18, 1939.   H. J. LONG   2,154,518
CONTROL VALVE FOR GAS-FIRED FLUID HEATERS
Filed Jan. 3, 1938
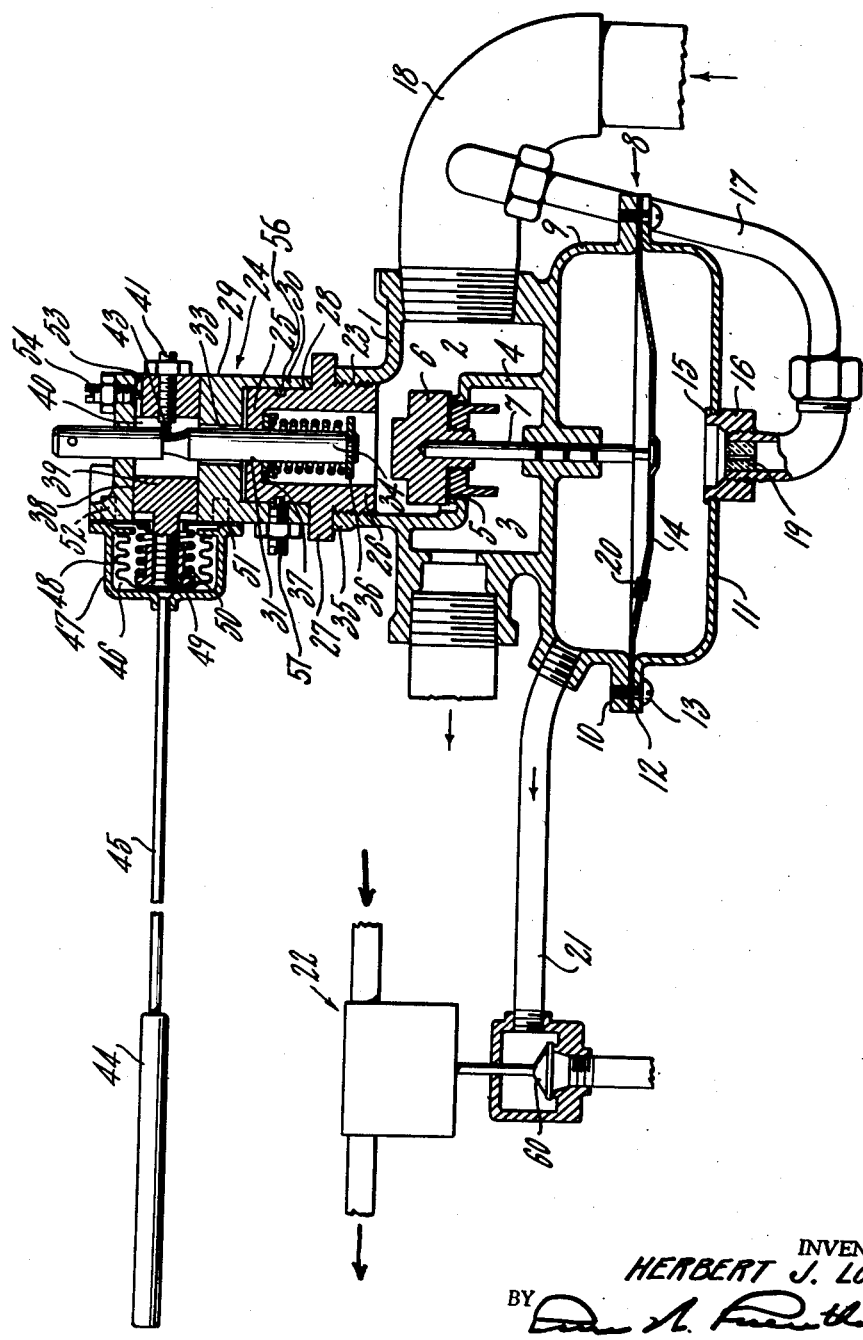
INVENTOR.
HERBERT J. LONG
BY 
ATTORNEY.

Patented Apr. 18, 1939

2,154,518

UNITED STATES PATENT OFFICE 2,154,518

CONTROL VALVE FOR GAS-FIRED FLUID HEATERS

Herbert J. Long, Springfield, Mass., assignor to American Bosch Corporation, Springfield, Mass., a corporation of New York Application January 3, 1938, Serial No. 182,991

4 Claims. (Cl. 137—139)

This invention relates to gas-fired fluid heaters, and more particularly to an automatic gas-control valve for such heaters.

In automatic heaters of this type it is common practice to provide a main valve responsive to the temperature within, or the flow of fluid through, the heater to control the flow of gas to the main burner, together with an additional safety device adapted to shut off the fuel to the burner in the event of failure of the flow controlled device. Such a dual control is necessarily more expensive than a single control both with respect to manufacturing costs and with respect to charges upon installation and repair.

It is a primary object of the present invention to provide a dual control system which is simple in construction and operation, and which may be readily assembled for installation or disassembled for repair.

The attainment of these and other objects and features of the invention will be apparent to those skilled in the art from a consideration of the following detailed description taken in conjunction with the accompanying drawing which shows a longitudinal sectional view, with parts in side elevation, of a control valve and associated parts, constructed in accordance with the present invention.

Referring to the drawing reference numeral 1 indicates a valve body having an inlet chamber 2 and an outlet chamber 3 separated by a partition 4 which is provided with an opening 5 adapted to be controlled by a valve 6. A stem 7 is detachably connected to one end of the valve 6 and extends through the valve body 1 into a diaphragm casing 8. This casing comprises a downwardly and outwardly projecting portion 9 preferably formed integral with the valve body 1 and having an outwardly extending peripheral flange 10 at the lower end thereof. A cup shaped member 11 is provided with a peripheral flange 12 adapted to be attached to the flange 10 by screws 13, a diaphragm 14 being clamped therebetween. The lower end of the stem 7 is attached to the central portion of the diaphragm 14 for actuation thereby. A central opening 15 in the cup shaped member 11 has a nipple 16 and permits communication, by way of a gas by-pass tube 17, between the main gas inlet 18 and the lower portion of the casing 8. A plug 19 in the gas by-pass tube 17 is provided with a #68 orifice in order to restrict the flow of gas from the main inlet to the lower portion of the casing 8. The diaphragm 14 has a plug 20 having a #72 orifice which permits restricted communication between the two chambers upon the opposite sides of the diaphragm 14. An outlet connection 21 is provided for the upper portion 9 of the casing 8 permitting flow of gas from the upper portion of the diaphragm chamber to a valve 60 controlled by a device 22 responsive to the flow of liquid through the system.

The valve body 1 is provided with an internally screw-threaded opening 23 aligned with valve 6 and of sufficient diameter to permit the insertion of the valve therethrough. The opening 23 is adapted to be closed by plug 24 preferably formed in two parts, the lower of which comprises a thimble 25 having an externally screw threaded portion 26 adapted to coact with the internal screw threads of the opening 23. A polygonal flange 27 on the thimble 25 immediately above the screw threaded portion 26 provides a suitable grip for a wrench in the attachment or removal of the plug from the valve body. The thimble 25 also is provided with a cylindrical portion 28 upon which is rotatably mounted the upper part of the plug 24 which part comprises a cylindrical member 29 having a downwardly projecting tubular portion 30 adapted to slip over the cylindrical portion 28. The thimble 25 has a central opening 31 and a longitudinal bore 33 extends through the cylindrical member 29 in alignment with said opening 31. A rod 34 extends through the opening 31 and the bore 33 and projects outwardly above the cylindrical member 29. A spring 35 surrounds the lower portion of the rod 34 within the thimble 25 and bears at one end upon a collar 36 fixed to the lower end of the rod 34. The opposite end of the spring 35 bears upon a washer 37 surrounding the central opening 31 in the thimble 25. A transverse bore 38 is provided in the upper end of the cylindrical member 29 in which bore a rod 39 is reciprocably mounted. A slot 40, through which the rod 34 extends, is provided in the rod 39. A screw plug 41 extends longitudinally of the rod 39 from one end thereof to the slot 40 and has a portion projecting into the slot upon which projecting portion a shoulder 43 formed on the rod 34 normally rests to hold the rod in its outermost position against action of the spring 35. A thermostat comprising a bulb 44 and a capillary tube 45 is connected to a fluid chamber 46 formed between a cup shaped member 47 and a Sylphon bellows 48. The Sylphon bellows 48 is attached to a reduced portion of rod 39 by a screw threaded bushing 49 having a peripheral flange for seating a spring 50 which surrounds the reduced portion of the rod 34 and bears at its opposite end upon a plate 51. The plate 51 is attached to the cylindrical member 29 by machine screws 52 while the cup shaped member 47 and the bellows are brazed or welded together to form fluid tight joints. A guide slot 53 in the rod 34 is adapted to coact with a reduced end portion of a screw plug 54 for permitting longitudinal but preventing angular movement of the rod 39. A peripheral groove 56 on the cylindrical surface of the thimble 25 is adapted to cooperate with a reduced end of a screw plug 57 to permit angular adjustment of the cylindrical member 29 upon the thimble 25 but to prevent longitudinal displacement thereof.

In the operation of the device as above described, assuming that water is being withdrawn from the heater, the control device 22 will open the valve 60 to cause a reduction of pressure in the connection 21 and the space within the casing 9 above the diaphragm 14. Since the pressure below the diaphragm will remain substantially that in the gas inlet 18, the diaphragm 14 will rise, opening the valve 6 and gas will be supplied to the main burner. When the hot water tap is closed and there is no longer a flow of liquid through the control device 22, the by-pass valve 60 will be closed and a pressure will be built up in the space above the diaphragm equal to the pressure therebelow. The weight of the diaphragm and the attached valve will cause the diaphragm to fall, thus closing the valve 6. If the gas valve in the control device 22 should become leaky or stick and fail to close, or if a leak should develop in the connection 21 or from the upper portion 9 of the diaphragm casing 8, then the pressure above the diaphragm will be reduced relative to the pressure therebelow even though no water were being withdrawn from the heater. At such time the safety gas shut-off device becomes effective. The excessive temperature produced expands the fluid in the bulb 44 which expansion is transmitted through the capillary tube 45 to the chamber 46 where it acts upon the bellows 48 to move the rod 39 to the right from the position shown. The reduced end portion of the screw plug 41 then slips from beneath the shoulder 43 on the rod 34 and the spring 35 forces the rod 34 downwardly to close the valve 6. The valve 6 cannot then be automatically reopened by a subsequent cooling of the contents of the heater but will require the attention of an attendant who can service the device before resetting the safety shut off by lifting the rod 34, through the handle provided upon the projecting end thereof.

From the above disclosure it will be seen that I have provided a safety cut off device adapted to act directly upon the main gas valve of an automatic heater and in which the safety gas cut off device may be easily attached or removed without disturbing other connections, such as the connections to the thermostatic control device and the like. Although there is hereindescribed but a single embodiment of the invention, other embodiments within the scope of the appended claims will be obvious to those skilled in the art from a consideration of the above disclosure.

Having thus described the invention, what is claimed is:

1. A valve body having a gas passage therethrough; a valve controlling said passage; said valve body having a threaded opening aligned with said valve of sufficient size to permit the insertion of said valve therethrough; a two part plug structure closing said opening; said plug structure comprising a threaded member adapted to coact with said threaded opening, and a second member mounted upon said threaded member; means permitting relative angular movement of said members while preventing relative longitudinal movement thereof; a rod extending through both of said members and projecting externally of said second member; a spring for biasing said rod toward said valve; a latch mechanism mounted in said second member for holding said rod away from said valve against the action of said spring; and thermostatically controlled means for releasing said latch mechanisms to close said valve.

2. A valve body having inlet and outlet compartments, a partition therebetween having an opening therethrough, a valve controlling said opening, a stem attached to said valve extending through one of said compartments and projecting through said body, a casing surrounding said projecting portion of said stem, a diaphragm actuating the projecting end of said stem and dividing said casing into two chambers, means for varying the fluid pressure effective upon one side of the diaphragm relative to that upon the other side for actuating said valve, said valve body having an opening aligned with said valve upon the side thereof remote from said stem and of sufficient size to permit the insertion of said valve therethrough, a plug closing said opening, a rod extending through said plug, a spring for biasing said rod toward said valve, a latch mechanism for holding said rod away from said valve against the action of said spring, and thermostatically controlled means for releasing said latch mechanism to close said valve.

3. A valve body having inlet and outlet compartments, a partition therebetween having an opening therethrough, a valve controlling said opening, a stem attached to said valve extending through one of said compartments and projecting through said body, a casing surrounding said projecting portion of said stem, a diaphragm attached to the projecting end of said stem and dividing said casing into two chambers, means for varying the fluid pressure effective upon one side of the diaphragm relative to that upon the other side for actuating said valve, said valve body having an opening aligned with said valve upon the side thereof remote from said stem and of sufficient size to permit the insertion of said valve therethrough, a plug closing said opening, a rod extending through said plug, a spring for biasing said rod toward said valve, a latch mechanism for holding said rod away from said valve against the action of said spring, and thermostatically controlled means for releasing said latch mechanism to close said valve, said rod having a portion projecting externally of said plug for manually resetting said latch mechanism.

4. A valve body having a gas passage therethrough; a valve controlling said passage; said valve body having a threaded opening aligned with said valve of sufficient size to permit the insertion of said valve therethrough; a two part plug structure closing said opening; said plug structure comprising a threaded member adapted to coact with said threaded opening, and a second member mounted upon said threaded member; means permitting relative angular movement of said members while preventing relative longitudinal movement thereof; a rod extending longitudinally of both said members; a spring for biasing said rod toward said valve; a second rod extending transversely through said second member; said first mentioned rod having an abutment adapted to engage an abutment carried by said second rod whereby said first rod is held away from said valve against the action of said spring; and thermostatically controlled means for actuating said second rod to disengage said abutments and release said first rod to close said valve.

HERBERT J. LONG.